Oct. 6, 1936.  W. B. STOUT ET AL  2,056,219
CAR TRUCK
Filed Sept. 2, 1933   9 Sheets-Sheet 7
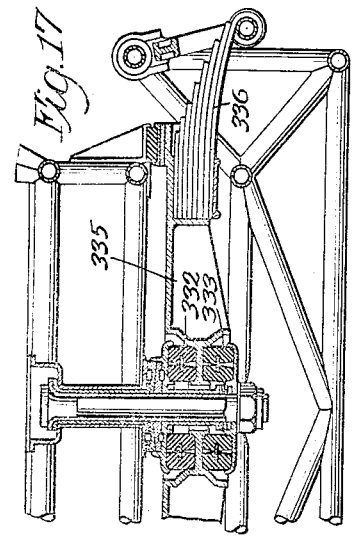
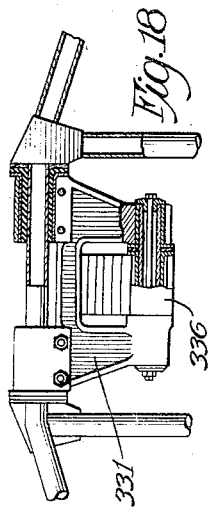
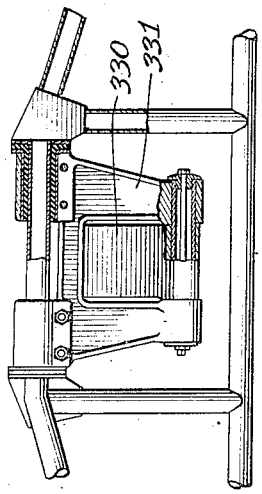
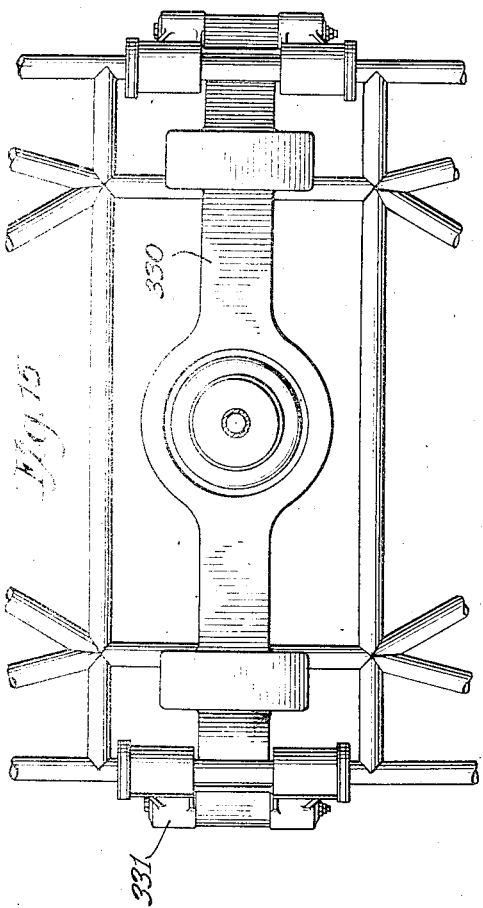
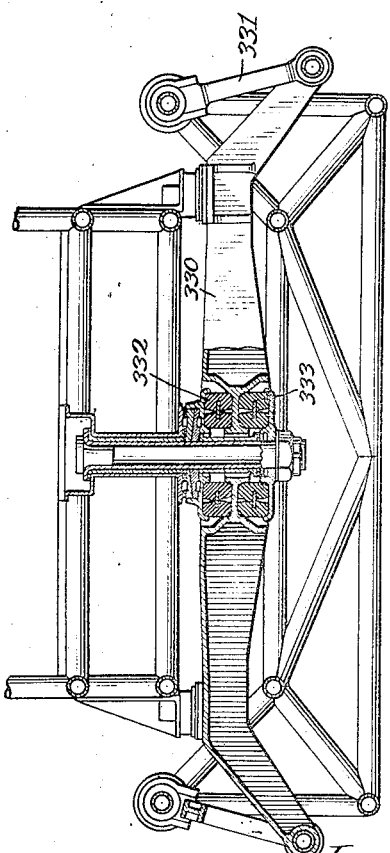
Inventors
William B. Stout
Evan H. Wright
By Gilson, Mann & Co.
Attys.

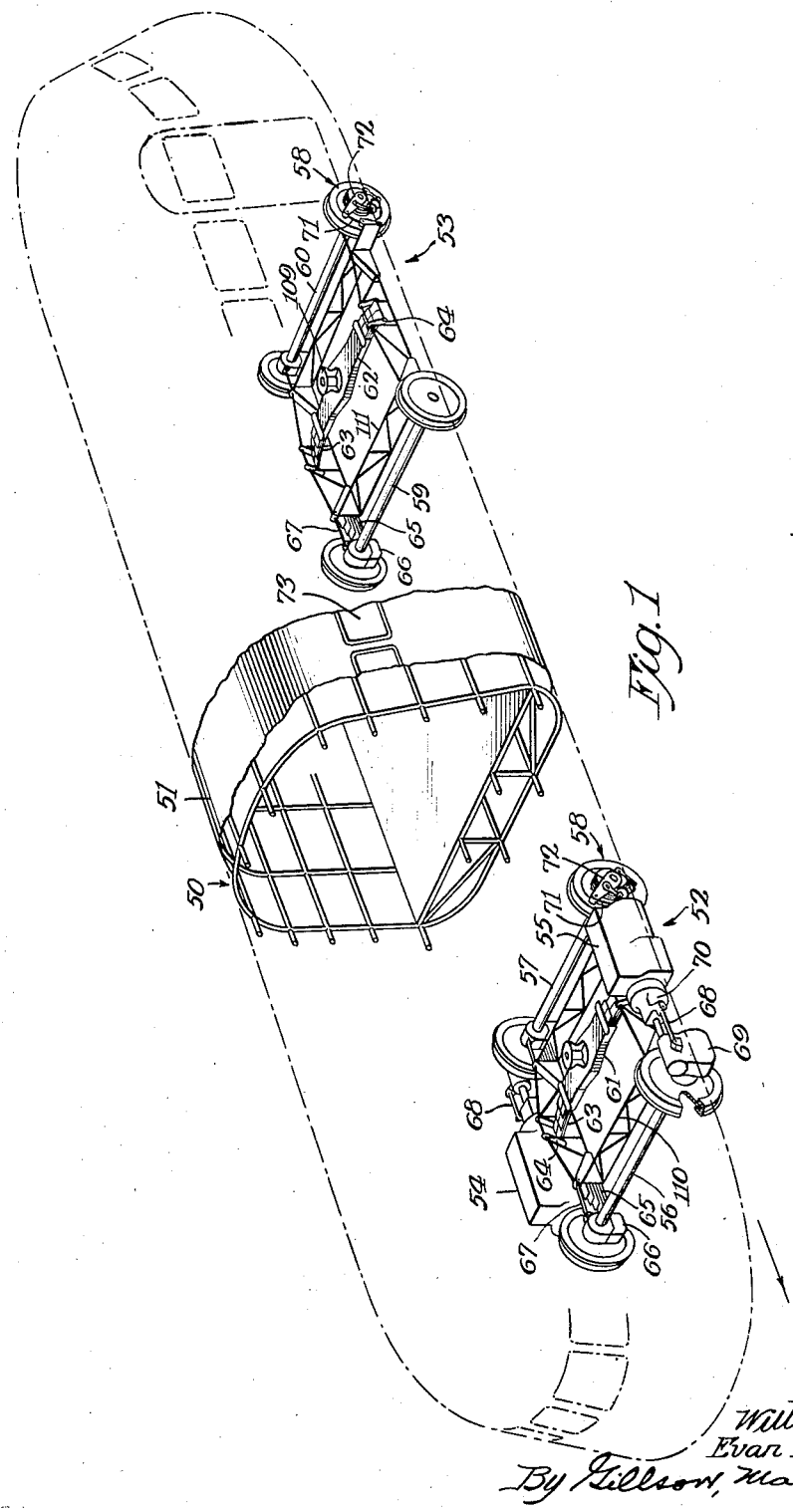

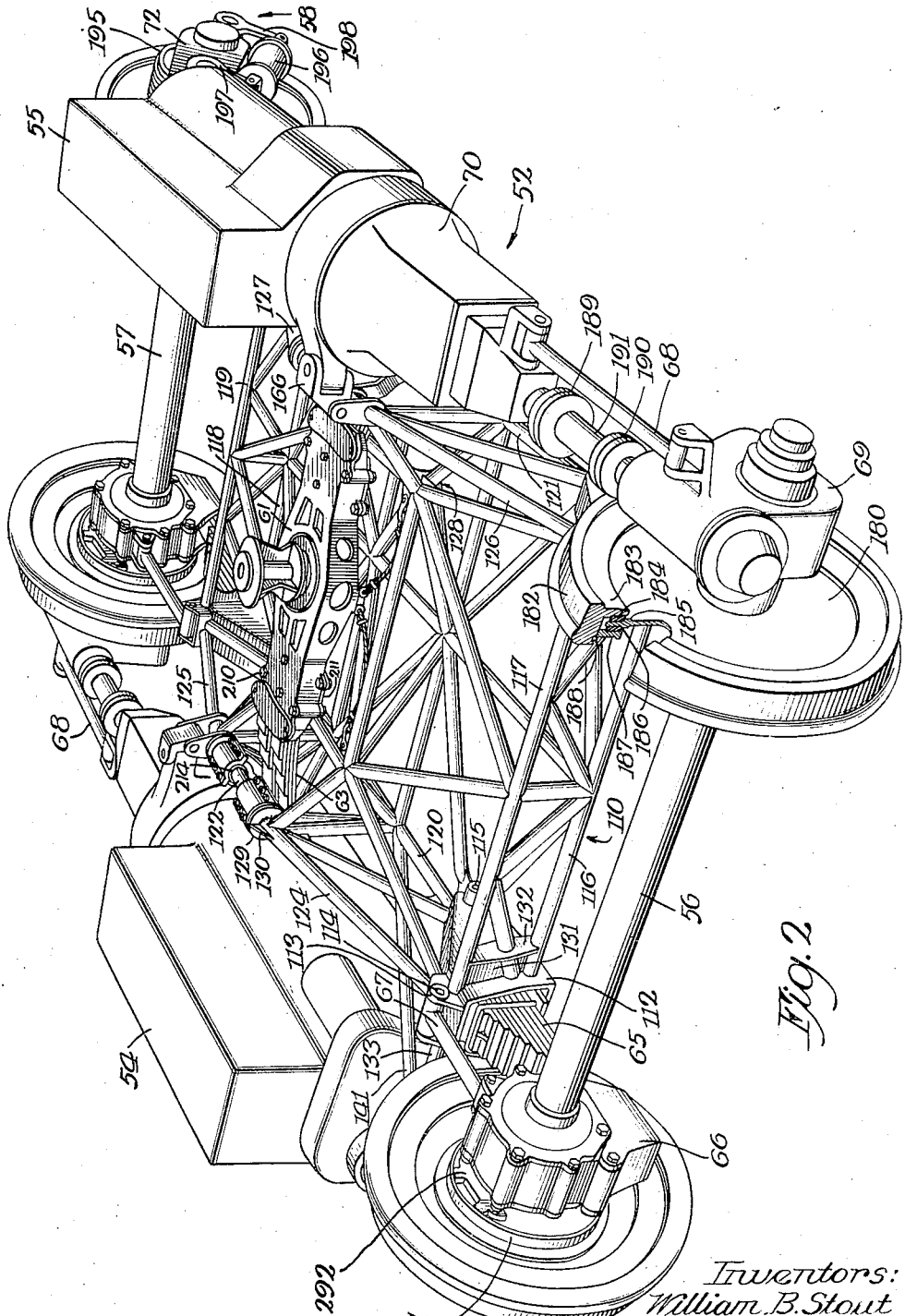

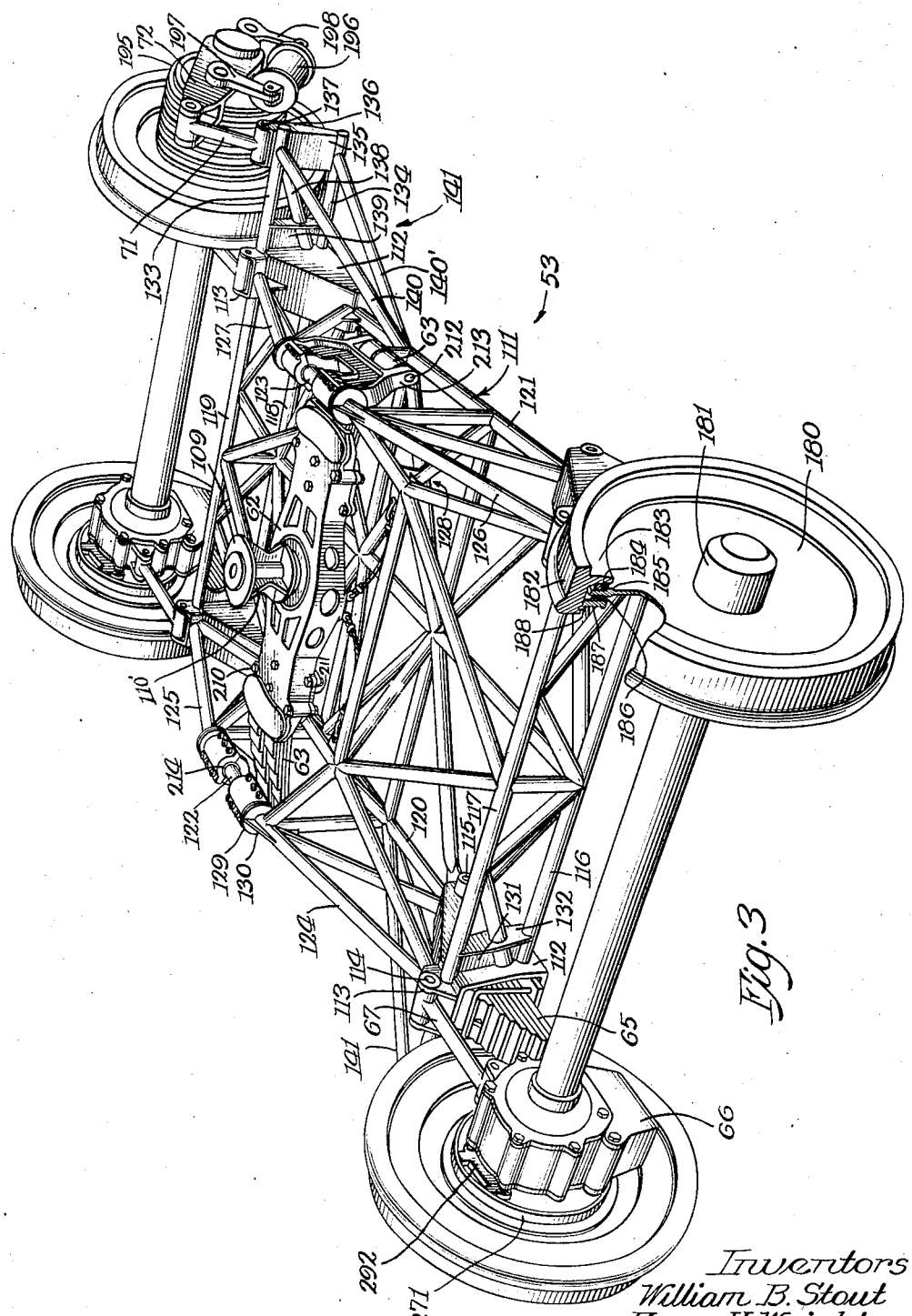

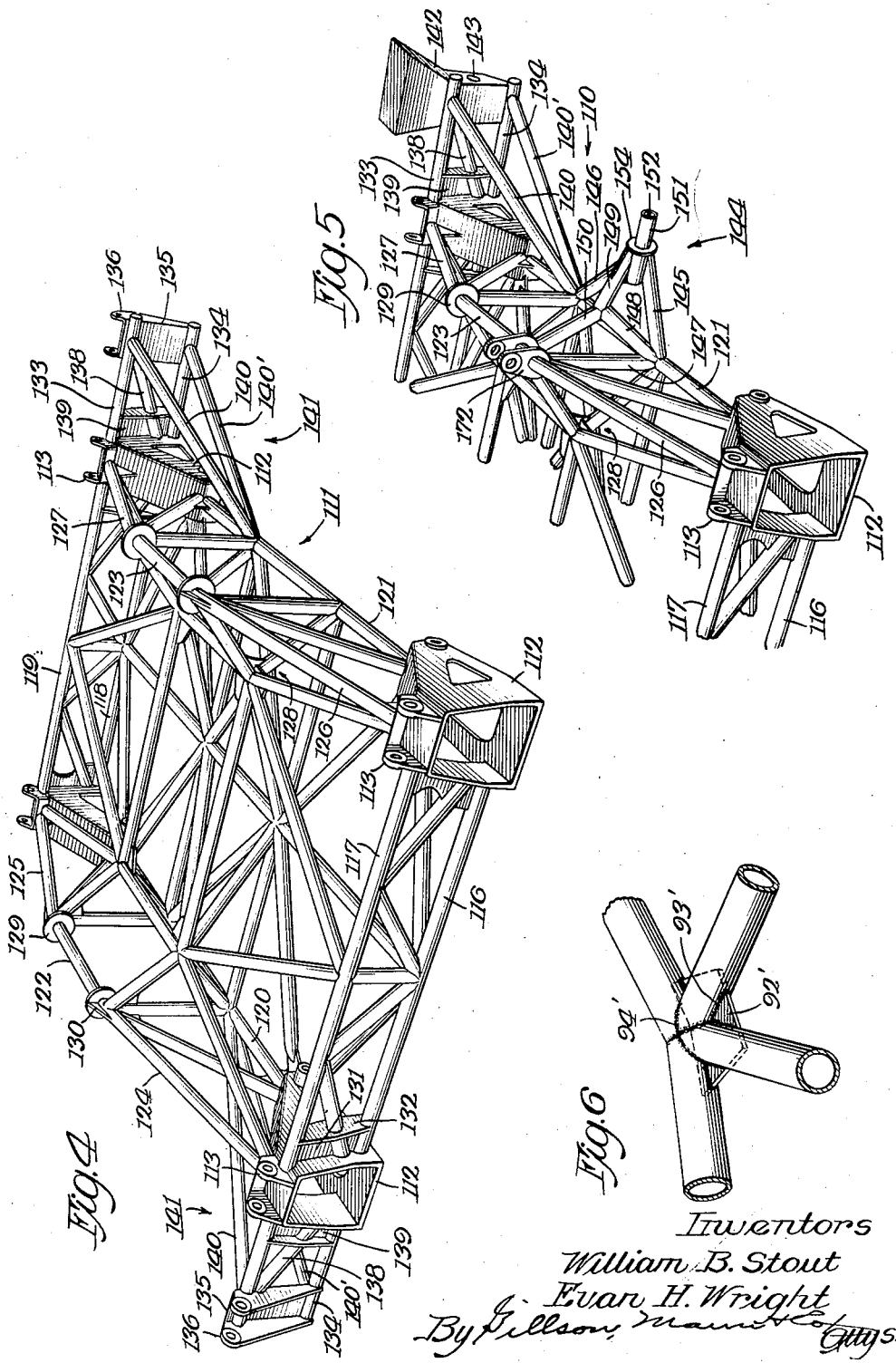

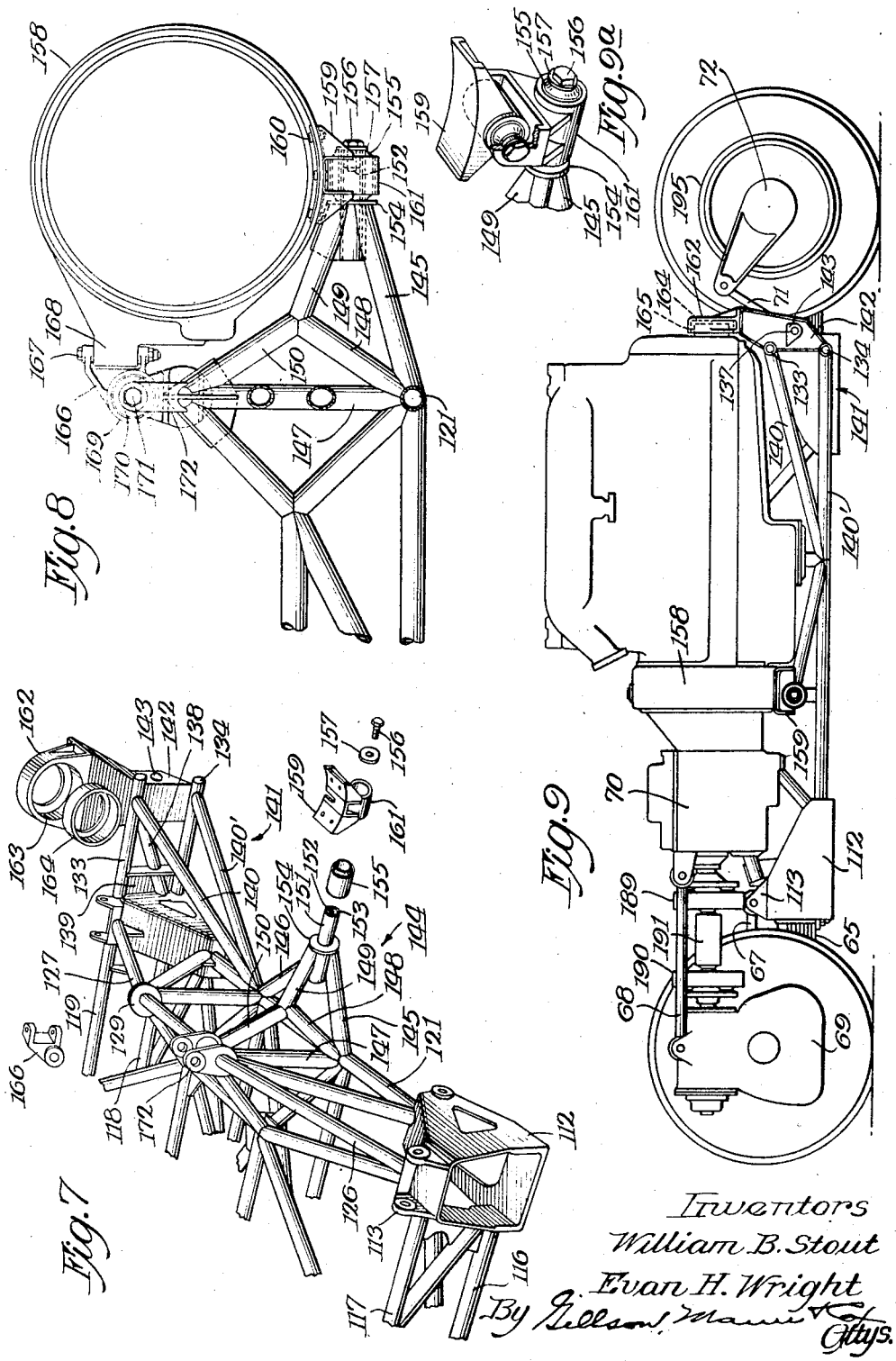

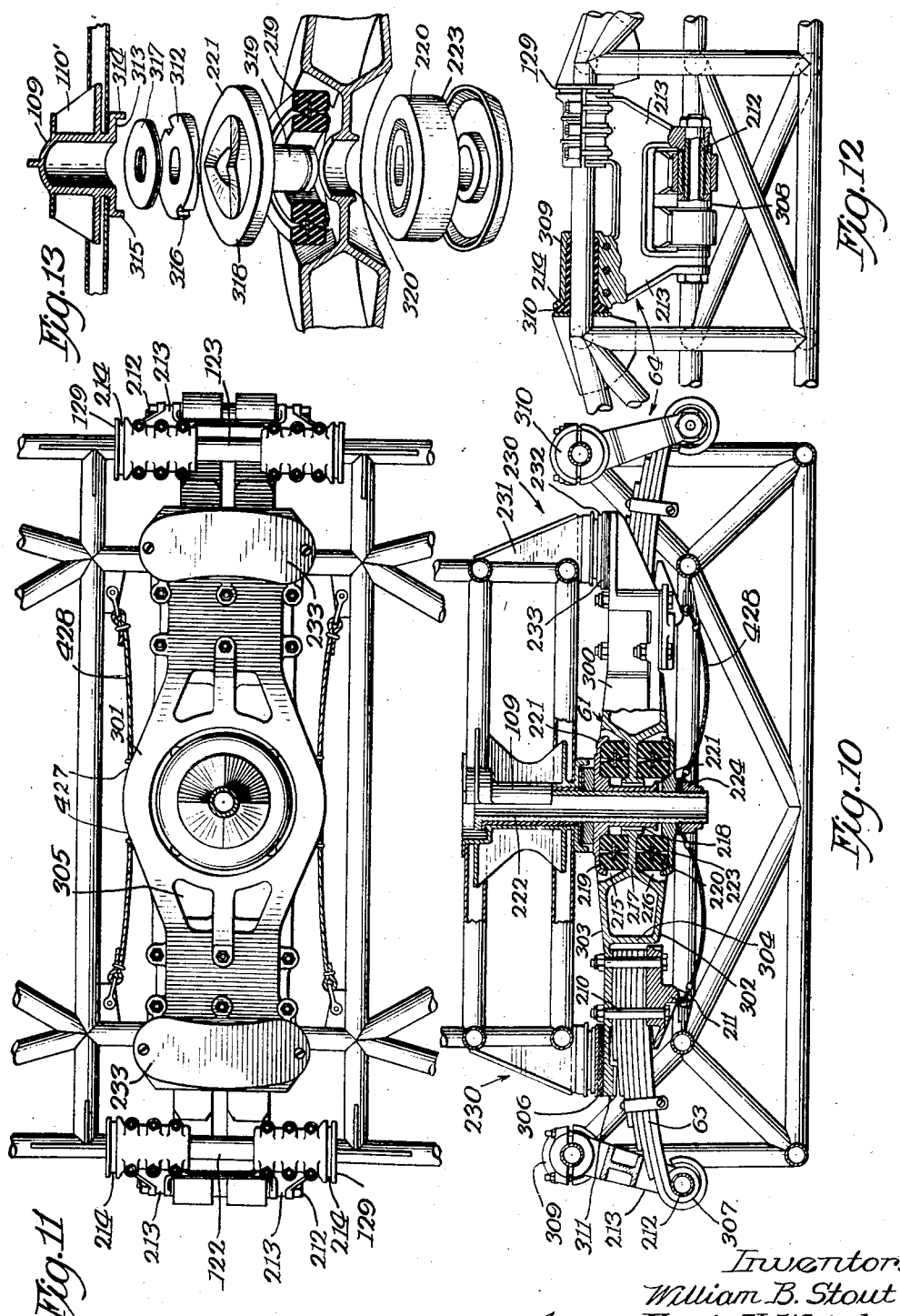

Oct. 6, 1936.   W. B. STOUT ET AL   2,056,219
CAR TRUCK
Filed Sept. 2, 1933   9 Sheets-Sheet 8
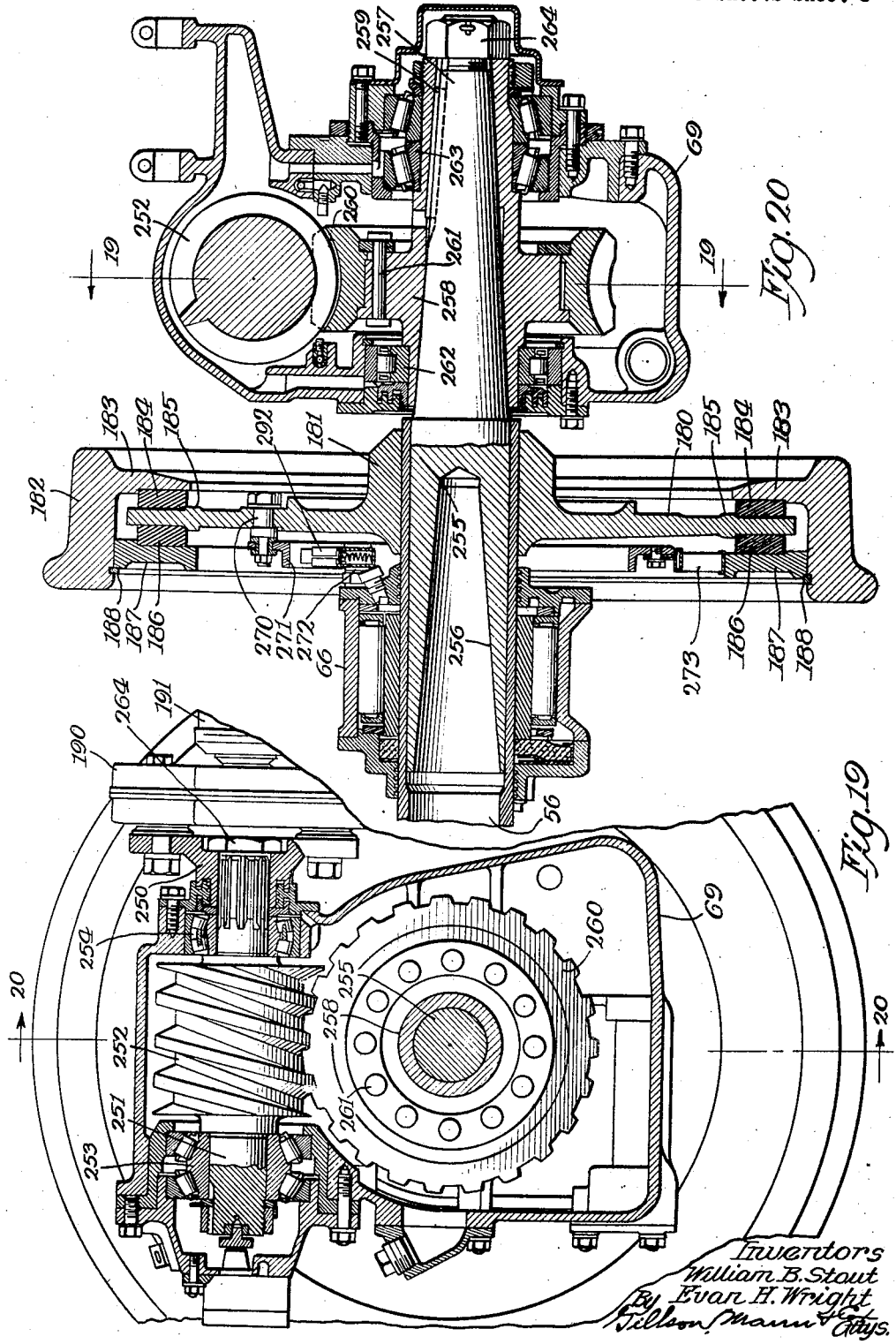

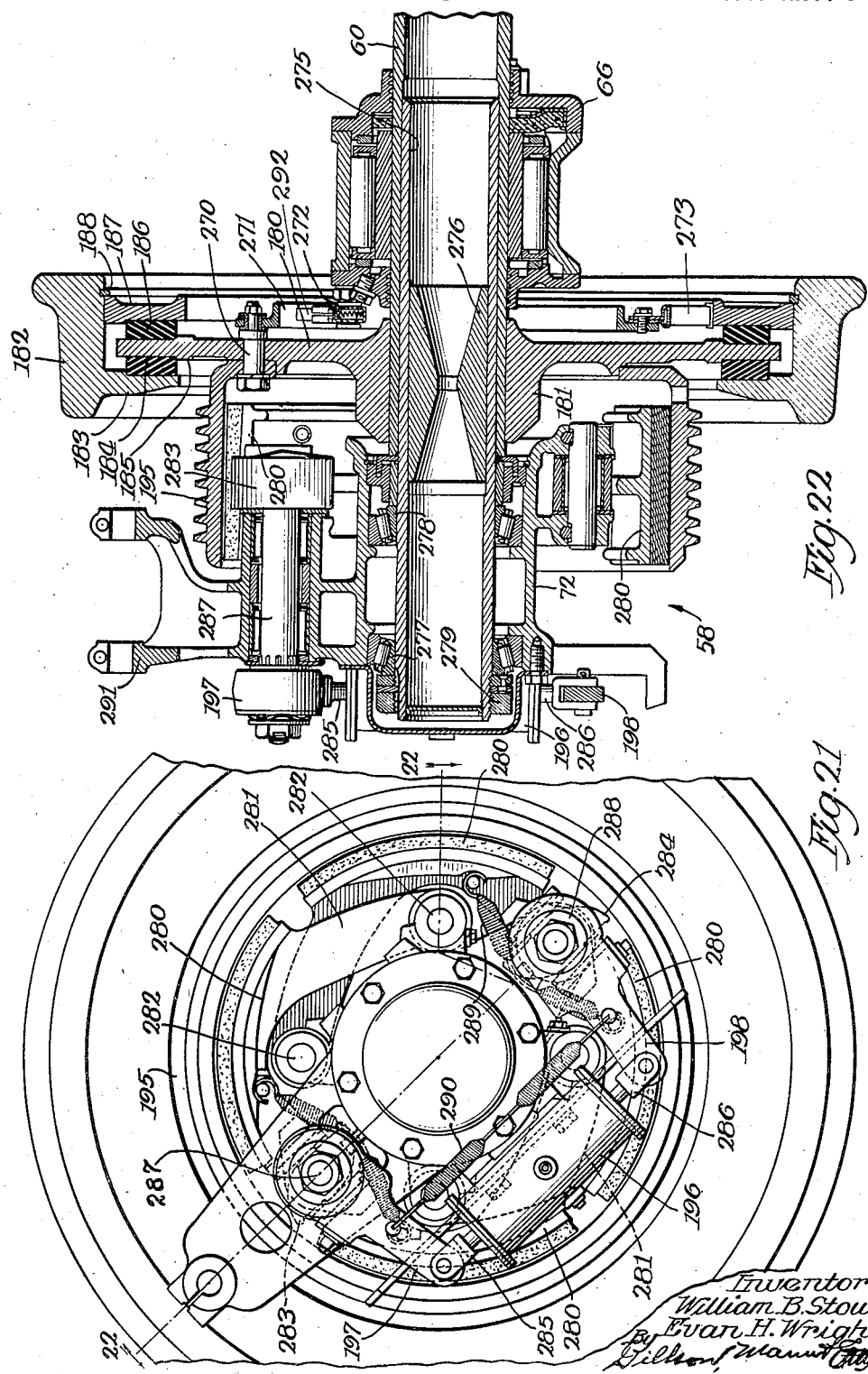

Patented Oct. 6, 1936

2,056,219

UNITED STATES PATENT OFFICE 2,056,219

CAR TRUCK

William B. Stout and Evan H. Wright, Detroit, Mich., assignors to Pullman-Standard Car Manufacturing Company, a corporation of Delaware Application September 2, 1933, Serial No. 688,002

30 Claims. (Cl. 105—119)

The broad aim of this invention is to make a car, of a given load capacity, lighter without loss of strength and shock resistance, and faster with less power as compared with prior cars, and also able to hold the track in spite of the greater relative wind velocity at angles to the line of travel which arise from the increased speed, all with appropriate cost; and otherwise suited to existing conditions.

Generally speaking, lightness with ample strength is obtained:

First: By using tubes for all structural members and welding for all joints, whereby the metal is used to the greatest advantage and heavy joint fittings and localized strains are obviated, and the whole body is made one coordinate entity; and Second: The motors and other weighty elements of the operating mechanism are mounted close to the rails and the parts to be driven or stopped, whereby the body, the center bearing, the side bearings, and all other parts in the line of force transmission, are relieved of much strain and may be made correspondingly lighter.

Being lighter, less power can handle the car as well as its best predecessor but, in addition, the air resistance (which increases rapidly with the speed, other things remaining the same) is tempered by lowering the car and reducing or eliminating suction areas, vortexes or whirls and reverse turbine effects between all parts of the car, the track and other stationary objects, whereby the speed can be increased out of all proportion to the power and speed of the past.

The greater speed increases the transverse component of all wind resistance (and with conventional forms would increase the resultant suction effects) and there would be greater tendency to overturning which the lighter weight would be less able to resist, but for the fact that the wind is passed easily and smoothly under and over the car and the flat upright surfaces are reduced to a minimum, whereby the pressure on the leeward side is kept close to that on the windward side.

More specifically, it is among the objects of this invention to provide a car truck that will be suitable for use in a high speed, light-weight rail car; that can be changed from a trailer truck to a driving truck with little modification; that is much lighter in weight than conventional car trucks, but fully capable of carrying its load; that normally tends to maintain itself in alinement with the car body; and that absorbs the greater part of the impact loads and noises set up by the truck moving along a track.

Further and other objects and advantages will become apparent as the disclosure proceeds and the description is read in conjunction with the accompanying drawings, in which:

Fig. 1 is a diagrammatic, perspective view showing the general organization of a car made in accordance with this invention;

Fig. 2 is a perspective view of the front truck;

Fig. 3 is a perspective view of the rear truck;

Fig. 4 is a perspective view of the space framework which constitutes the rear truck frame;

Fig. 5 is a fragmentary, perspective view illustrating the slight modification necessary to enable a driving motor to be mounted on the truck frame;

Fig. 6 is a perspective view of one of the welded tube joints;

Fig. 7 illustrates the means for mounting one of the driving engines on the car truck;

Fig. 8 is a sectional view showing the rear motor supports;

Fig. 9 is a side elevational view of the front truck, showing particularly the relationship of the front and rear motor supports;

Fig. 9a illustrates a modified form of rear motor support;

Fig. 10 is a transverse, sectional view showing a preferred form of the swing bolster assembly;

Fig. 11 is a plan view of the swing bolster assembly with the car body removed;

Fig. 12 is an end elevational view, though partly in section, showing the bolster supported on the spring hangers;

Fig. 13 is an exploded perspective view of the center bearing assembly;

Figs. 14, 15, and 16 illustrate a modification of the swing bolster assembly, the views corresponding to Figs. 10, 11, and 12 of the preferred form;

Figs. 17 and 18 illustrate a further modification of the swing bolster assembly;

Fig. 19 is a sectional view taken through the worm gear casing, the section being taken on the line 19—19 of Fig. 20;

Fig. 20 is a vertical sectional view taken through the worm gear casing, the section being taken on the line 20—20 of Fig. 19;

Fig. 21 is a side, elevational view of the brake mechanism carried at diametrical ends of the axles;

Fig. 22 is a sectional view taken on the line 22—22 of Fig. 21.

At the outset, it should be understood that the selection of certain preferred and modified forms of the invention for illustration and description is merely for the purpose of disclosure, for the invention may be variously embodied within the scope of the appended claims. Limitations, therefore, are not to be read into the claims unless required by the prior art.

General organization (Fig. 1)

The car body, it will be observed, comprises a space framework 50 of metal tubing that is welded together to form a rigid unitary body. The framework is covered by a metal skin 51 which is secured to the framework and assists in resisting torsional strain.

The body is supported by a front truck 52 and a rear truck 53, the former having internal combustion engines 54 and 55 mounted outboard on opposite sides of the truck. The front truck includes wheeled axles 56 and 57, diagonally opposite ends of which are driven by the motors 54 and 55. That is, the axle 56 is driven from one end by the motor 55 at one side of the truck and the axle 57 is also driven from one end by the motor 54 at the opposite side of the truck. The undriven ends of the axles 56 and 57 are equipped with brake operating mechanisms, generally indicated at 58.

The rear truck 53 includes wheeled axles 59 and 60, each of which are braked by mechanism corresponding to the mechanism 58 of the front truck.

The driving motors are preferably either gasoline or Diesel engines, and each has a horsepower rating of 160 or more,—the exact rating, of course, being dependent on the performance desired.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon swing bolsters 61 and 62 of the front and rear trucks, respectively, and, preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal 66. The point of connection between the projecting spring and the journal, is underslung with respect to the axles.

Driving and braking forces applied to the car axles are transmitted to the truck frames by radius rod 67. Other radius arms 68 which connect the worm gear casing 69 to a fixed point on the car truck,—in this case, the transmission housing 70,—take the thrust of the driving worm. Braking forces are resisted by torque arms 71 which connect the brake housing 72 to the truck frame.

The car body, it will be seen, is elongated and has a tapering blunt nose and tail to reduce wind resistance. The outer surface of the car consists of smooth broad curves well blended together to produce a graceful appearance and at the same time directing the air currents around the car with minimum effort. The windows 73 are flush with the outer skin, and are made stationary as it is contemplated that a forced system of ventilation will be used.

The bottom of the car is uninterrupted in outline except for the wheels of the truck which project through the metal skin enveloping the body framework.

Truck frames

The front and rear truck frames 110 and 111, respectively, are substantially identical, the principal difference between the two being that the former, in addition to being made of heavier gauge tubing, is provided with the necessary outrigging for supporting the driving motors. Since the two frames are so nearly alike only one will be described in detail, and corresponding elements will be identified in the drawings by like reference characters.

The rear truck frame 111, which is best shown in Fig. 3, comprises a space framework made up of a plurality of metal tubes, preferably of steel, arranged to resist the forces which act upon the truck, and having their intersecting ends welded together to form a rigid unitary structure.

At the four corners of the framework are spring housings 112, each of which consists of a bell-shaped casting that is welded into the space framework. Integrally cast upon the upper portion of the housings are spaced lugs 113, which are adapted to receive pins 114, for securing the inner ends of the radius rods 67 to the truck frame.

The open end of each bell housing 112 faces toward the adjacent axle, and is adapted to receive the semi-elliptical springs 65, which are shackled in the housings by bolts 115, which pass through suitable reinforced apertures at the rear of the housings. The housing 112, instead of being cast, may be built up by welding steel plates together of appropriate size and form.

The four spring housings are joined together by transverse, tubular members 116 and 117 and 118 and 119, respectively, and by longitudinal tubular members 120 and 121, each of these tubular members being securely welded to the spring housings.

Since the bolster 62 must be capable of swinging laterally, swing hanger bearings 122 and 123 are provided which preferably are somewhat above the tops of the spring housings 112. The bearings are in alinement with the side trusswork and connect with the spring housings by tubular members 124 and 125, and 126 and 127, respectively. Suitable vertical and horizontal tubular trusswork join the sides and ends of the frame so that the necessary strength and rigidity is obtained. It will be noted, however, that this trusswork is carried inwardly and downwardly from the swing hanger bearings 122 and 123 in such manner that suitable clearance is allowed for the lateral movement of the swing bolster 62.

Whenever there is need for a particularly strong joint in the truck framework, the intersecting tubes are slit as shown in Fig. 6 to receive a reinforcing plate or gusset 92' which is then welded to the tubes as indicated at 93', after which the tubes themselves are welded together as indicated at 94'.

The swing hanger bearings 122 and 123 are flanked by bearing disks 129 which telescope over the bearings 122 and 123 and are welded to gusset plates 130 which constitute a part of the adjacent joints.

The forces which act upon the truck framework create a rather large shearing stress between the spring housings and the connecting cross members 116, 117, 118, and 119. To counteract this stress, ribs 131 are welded to the inner sides of the housings and the connecting cross members, and in order to prevent the ribs from buckling, plates 132 are welded at right angles to the ribs between the upper and lower transverse cross members 117, 116, 119, and 118, respectively. All radius rods, torque arms and the like, used on the truck frames, are preferably equipped with rubber bushings to reduce noise and cushion shock.

It has previously been stated that the brake mechanism is applied to diagonally opposite ends of the truck axles and that a torque arm 71 connects the brake housing 72 to the truck frame to prevent the latter from rotating on the axle. Since the brake mechanism is mounted on the exterior of the car wheels, it is necessary to provide an outrigger 141 for taking the thrust of the torque arm 71.

In the present embodiment of the invention, the outrigging consists of two parallel tubular members 133 and 134 welded to the exterior of the spring housings which are adjacent to the wheels carrying the brake mechanism. The ends of the tubes 133 and 134 are connected by a reinforced plate 135 which is provided with lugs 136 adapted to receive a retaining pin 137 for securing the torque arm 71 to the outrigging.

The tubes 133 and 134 are trussed vertically by a tube 138, and a reinforcing construction 139 similar to that on the interior faces of the housings 112 is provided to counteract the shearing stress. A horizontal tubular truss member 140 is welded to, and extends between, the tube 133 and the tube 121, the intersection being directly beneath the bearing disk 129 nearest to the outrigging. A similar truss member 140' connects the tube 134 to the same joint.

Engine mounting

Except for the use of heavier gauge tubing, the rear truck requires little modification to enable it to carry driving engines. The outrigging 141 remains the same except that the plate 135, Fig. 3, is replaced by a built-up box-like structure 142 (Figs. 5, 7, and 9) which has reinforced apertures 143 in its side walls through which the retaining pin 137 of the torque arm 71 passes. The point of attachment for the torque arm being slightly lower than it is shown in Fig. 3, it results that the brake housing 72 is rotated slightly more to the left in the front truck than it is in the rear truck.

Each driving motor is supported on the truck frame by three attachments, one being directly beneath the flywheel, a second being at the front of the motor, and a third being a connection between the upper part of the truck frame and the flywheel housing. (See Figs. 7, 8, and 9).

The rear motor support, which engages the bottom of the flywheel housing, requires a second outrigging 144 which consists of tubes 145 and 146, the former projecting substantially horizontally at right angles from the longitudinal frame member 121 so as to bring the rear point of support for the motor directly opposite the vertical tube 147 which takes parts of the downward thrust from the swing hanger bearing 123. Vertical truss tubes 148, 149, and 150 fix the vertical position of the stub bearing 151 which is rigidly welded to the ends of the tubes 145, 146, and 149.

The stub bearing 151 consists of a short piece of tubing, in the outer end of which a plug 152 is welded, the latter being drilled and tapped, as indicated at 153. A collar 154 telescopes over the stub bearing and takes the inward thrust on the outrigging 144.

A rubber bushing 155, lined on both inside and outside with metallic sleeves, fits over the end of the stub bearing 151, and is secured in place by a bolt 156, assisted by a washer 157, the former screwing into the tapped hole 153 in the end of the stub bearing.

On the bottom of the flywheel casing 158 is a bracket 159, which is secured to the casing by bolts 160. The bracket has welded to its underside a sleeve 161, which is adapted to have a tight fit over the bushing 155, thus giving the motor a resilient lower support.

The front motor support consists of a pillow block or trunnion bearing 162, that is secured to the top of the housing 142 by bolts or equivalent means. The block has a circular recess 163 (see Fig. 7), adapted to receive a collar 164 of rubber (see Fig. 9), lined on both inside and outside with metal rings. The front end of the motor is equipped with a circular boss 165, adapted to fit within the resilient collar 164, thus giving the front end of the motor a slightly yieldable support.

The motor is stabilized upon the front and rear supports by a clevis 166, which is secured by a bolt 167 to a boss 168 on the flywheel casing. The clevis has a horizontal cylindrical portion 169, fitted with a resilient bushing 170, similar to the bushing 155 of the lower motor support, and a bolt or retaining pin 171, passing through upstanding ears 172 on the truck frame, rigidly secures the clevis to the frame. The clevis lies in substantially the same vertical plane which includes the lower motor support and the tubular members 145, 147, 148, 149, and 150.

An alternate arrangement for the rear motor support is shown in Fig. 9a. In this case two cylinders, at right angles to one another, are carried by the bracket 159, and each is equipped with a rubber bushing. This arrangement simulates a universal joint and has corresponding advantages.

Resilient wheel

Every time a car truck passes over a rail joint, an impact is delivered to the truck which may be several times the normal load. Ordinarily this necessitates understructure designed to take the additional load, and in order for this to be done, the structure must be proportionately heavier.

Engineers for some time past have endeavored to develop a resilient wheel which would make car riding more comfortable and less noisy. All manner of devices have been used to introduce the desired resiliency in the car wheel, but they have failed for some reason or other. Whenever rubber was used, it was found that the continual distortion of the rubber generated so much heat that it soon burned up.

It has recently been discovered that rubber may be subjected to enormous shearing stresses if it is first placed under compression at right angles to the shearing stress. It is this principle which is utilized in the resilient wheel shown in the drawings and hereinafter described.

The wheel is shrunk upon the supporting axle and comprises a web 180 and a hub 181. A hardened steel tire 182 having a depending flange 183 is placed over the web with an annulus 184 of high grade rubber interposed between the flange 183 and the wheel web. The web is slightly shouldered, as indicated at 185 to support the annulus in place.

A similar annulus 186, also of high quality rubber, is placed on the other side of the wheel web, and the two annuli are then compressed against the web by applying pressure to a hard metal rim 187 which is then locked in place by a ring 188 which seats within a suitable groove in the wheel tire. The inner surface of the wheel tire does not contact with the wheel web so that the entire load of the car on the wheel is transmitted from the wheel web 180 to the tire 182 through annuli 184 and 186 which are continually under shear.

By using resilient wheels, in place of the ordinary solid wheels, the fabrication of a lightweight car truck from metal tubing becomes feasible.

Axle drive

The automatic transmission assembly preferably has three speeds forward and one for reverse, the first two forward speeds acting as free wheeling units. The transmission is entirely automatic in operation, and is made in accordance with the disclosures of United States Patents Nos. 1,843,193, 1,843,194, and 1,843,195, issued February 2nd, 1932, and Patent No. 1,851,146, issued March 29th, 1932.

The great advantage which arises from using automatic transmissions in combination with the general truck organization is that it is unnecessary to carry gear shift connections from the transmission to the motorman's cab at the front of the car body. The gears are shifted automatically by manipulation of the engine throttles.

The driving connections between the motors and the car axles may, of course, assume various forms, but in the present embodiment of the invention a worm drive is employed. The drive shaft 191 is equipped with universal joints 189 and 190, and has a hollow hub extension 250 (Fig. 19) that is splined to a shaft 251, and held in place by a nut 264. The shaft 251 carries a worm 252, and is suitably journaled at 253 and 254 in the gear casing 69. Relative horizontal and vertical movement between the gear casing and the driving motor is taken up by the universal joints.

The axle 56 (Fig. 20) is tubular in form,—as are the other axles,—and it has a stub axle 255 driven into its outer end. The stub axle is cored out, as indicated at 256, to prevent localization of strain and reduce weight, but sufficient body is left to it so that it adequately reinforces the axle where the wheel hub 181 is shrunk over the end of the axle.

The projecting end 257 of the stub axle is carefully machined to a taper, and carries a steel hub 258, which is held fixed with respect to the extension by a key 159 and a retaining nut 264. A bronze worm gear 260 is secured by bolts 261 to the exterior of the hub 258, and is adapted to mesh with the worm 252.

The weight of the gear casing and its associated parts is carried by the axle extension 257 on roller bearings 262 and 263, one being on each side of the worm gear 260 and both having their inner faces sleeved over the hub 258.

The driving and braking torque transmitted through the worm to the gear case 69 is counteracted by the torque rod 68, which extends between the gear case and the transmission housing.

Preferably the stub axle 255 extends inwardly slightly beyond the journal 66, in order to reinforce the tubular axle at the point where the truck load is carried.

Brakes

In Figs. 21 and 22 details of the brake mechanism 58 are shown. For the purpose of disclosure let it be assumed that the tubular axle, shown in Figs. 21 and 22, is the rear axle 60 of the trailer truck 111, although the brake mechanism is mounted on the other axles in substantially the same manner, the only difference being that in the front truck the brake housing 72 is rotated slightly more to the left than it is in the rear truck. The brake drums 195 are secured by bolts 270 to the exterior of the wheel web 180. The same bolts secure a collector ring 271 to the interior face of the wheel web. The purpose of the collector ring is to enable the car to automatically operate railway crossing signals by supplying sufficient potential from a source carried by the car to break down the contact resistance between the wheels and the track. The brush 292 (Figs. 2 and 3) which supplies potential to the collector ring is supported by the stud 272, projecting outwardly from the journal 66 (Fig. 22), and the metallic connection between the wheel tire 182 and the web 180 is established by the conductor 273.

The axle 60 has a tubular extension 275, which has a tight fit with the axle. The extension not only furnishes a stub axle upon which the brake housing 72 may be mounted, but in addition it reinforces the axle in the vicinity of the journal 66. The axle is further reinforced against the crushing force of the wheel by the insertion of a plug 276 at the point where the wheel hub is shrunk upon the axle.

The brake housing is equipped with roller bearings 277 and 278 which are adapted to support the brake housing on the axle extension and permit their relative rotation. A suitable retaining nut 279 holds the housing on the axle. In the present embodiment of the invention, four cast iron brake shoes 280 are mounted within the brake drum 195 and have arms 281 which are pivoted at 282 to the brake housing, as will be seen in Fig. 21. The arms 281 of adjacent shoes are offset and overlap one another so that one shoe will move in a counterclockwise direction around its pivot while the adjacent shoe will move in a clockwise direction during the application of the brakes.

The shoes are pressed against the brake drum by cams 283 and 284, the cam surfaces of which engage the ends of the brake shoes that are remote from their point of anchorage.

The cams are operated to apply the brakes by allowing air or other fluid to enter an air cylinder 196 which forces opposed push rods 285 and 286 from the cylinder, which in turn rock arms 197 and 198. The arms are splined upon shafts 287 and 288 extending parallel to the car axle, and cams 283 and 284 are mounted on their inner ends respectively so that, upon forcing the push rods 285 and 286 outwardly the double cam faces of the cams 283 and 284 act to force the brake shoes 280 against the interior of the brake drum 195 and thus frictionally bring the car to a stop.

Suitable coil springs 289 extending between the brake shoes and the brake housing assist in releasing the brakes when the fluid pressure in the cylinder 196 is reduced. Springs 290 connecting the arms 197 and 198 return the parts of the brake operating mechanism to their normal and operative position in a like manner.

The braking torque, it will be understood, is transmitted to the truck frame by the arm 71 (Fig. 1) which connects with the brake housing at the jaw 291.

Swing bolster assembly

The preferred form of the swing bolster assembly is best shown in Figs. 10 through 13, inclusive, although reference to Figs. 1, 2, and 3 may be of assistance. As the assemblies are the same for both front and rear trucks, it will only be necessary to describe one in detail.

The bolster 61 comprises a hollow casting 300 having an enlarged central portion 301 provided with circular depressions 215 and 216 on its upper and lower faces, respectively. The dividing wall 217 between the two depressions forms an annular ledge which is substantially half way between the top and bottom walls of the bolster. The inner margin of the ledge is enlarged, as indicated at 218 to form a wearing surface for the center bearing assembly.

The bottom wall 302 of the bolster is joined to the top wall 303 by an intermediate vertical wall 304 leaving suitable openings at the bottom of the bolster for inserting the springs 63 at each end thereof.

Two quarter-elliptical springs are mounted in the recesses at the ends of the bolster and are clamped in place by bolts 210 which draw retaining plates 211 tightly against the bottoms of the springs.

The bolster is cored out wherever possible as, for example at 305, to reduce weight. The ends of the bolster are slightly enlarged to receive arcuate chrome-plated steel plates 233, which cooperate with the side bearings 230 on the car body. The plates 233 are suitably spaced from the bolsters by shims 306.

The ends of the spring 63 are provided with double eyelets 307 adapted to engage a bolt 212 which joins adjacent arms 213 of the spring hanger 64. In case the bottom leaf of the spring breaks, the adjacent leaf will support the spring on the spring hanger.

Each of the spring hangers 64 consists of a casting having depending arms 213 through the ends of which the bolt 212 is adapted to pass. The two springs suspended from each hanger are separated by a spacer 308 telescoped on the bolt.

The upper ends of the spring hangers 64 are bifurcated and are adapted to be pivotally clamped to the bearings 122 and 123 by bearing caps 309. Rubber bushings 214 interposed between the swing hanger bearings and the tubular bearing supports 122 and 123 resist side sway of the car body by being placed in shearing strain. The bushings are enlarged as indicated at 310 to bear against the disks 129 and cushion the truck frame from side thrusts.

The extreme ends 311 of the bolster are so spaced with reference to the springs 63 that when the car body tilts one way or the other beyond a given angle the end of the bolster forms a new fulcrum for the springs with shorter leverage. This arrangement assists in preserving the life of the springs.

The bolts 212, which connect the arms 213 of the swing hanger casting, are fitted with "Oilite" bushings, so that proper lubrication is provided for the ends of the spring.

Lateral travel of the swing bolster is limited by cables 428, which extend between the cable anchors 427 on the bottom of the bolster and adjacent joints on the truck frame.

Center bearing

In conventional center bearing constructions, the car truck is swiveled to the body by a center pin which passes through the body bolster and the truck bolster, and the weight of the body is carried by some kind of an anti-friction device that is interposed between the truck and body center plates. In the present invention, there is no body bolster, but instead, the center pin passes through a collar 109 welded into the understructure of the car body, and through a semi-floating truck center plate which is adapted to absorb much of the vibration and noise that is ordinarily transmitted from the truck to the car body.

The center bearing assembly is best shown in Figs. 10 and 13 and comprises essentially a body center plate 312, a truck center plate 221, two rubber annuli 219 and 220, a retaining cap 223 and a center pin 222 which receives a nut 224 on its lower end.

The collar 109 which is provided with laterally extending reinforcing ribs 110' has a round bottom face 313 which is flanked by a downwardly extending flange 314. At one or more points on the flange 314, a lug 315 is provided which is adapted to engage a cut-away portion 316 in the body center plate 312. The outside diameter of the body center plate corresponds to the inner diameter of the flange 314 so that the former fits snugly within the bottom of the collar 109 and is held against rotation by the lug or lugs 315. Shims 317 are provided for adjusting the height of the car body with reference to the truck bolster, as this is necessary to enable the side bearings 230 to function properly.

The truck center plate 221 is more or less mushroom shaped and has a flange 318 adjacent its top which is adapted to seat upon the rubber annulus 219 in the top cavity 215. The shank 319 of the center plate extends through the opening 320 in the truck bolster, but normally does not contact with the wear surface 218. The truck center plate is clamped in place by retaining cap 223 which engages the underside of the annulus 220 and forces it against the annular ledge 217. A nut 224 which screws upon the center pin 222 holds the parts in assembled relation.

The customary use of roller or ball bearings between the truck and center plates is rendered unnecessary in the present construction: first, because the car body is extremely light-weight; and secondly, because the body center plate 312 is made of a self-lubricating material known to the trade as "Oilite". This material not only eliminates the necessity for lubrication, but in addition is extremely tough and wear resistant.

The contacting surfaces of the body and truck center plates are cut with complementary double helical surfaces, as shown most clearly in Fig. 13, in order to normally maintain the car truck in alinement with the car body. When a car is travelling at high speeds, there is a tendency for the truck to weave in and out between the rails of the track, thereby causing danger of derailment and wear on the wheel flanges. By providing the mating faces of the truck and body center plates with complementary surfaces, as shown in Fig. 13, any tendency of the truck to turn with reference to the car body is resisted by the weight of the car, for any relative rotation between the truck and the body slightly lifts the latter and is opposed by gravity.

The truck center plate 221 which is resiliently supported by the annulus 219 is capable of limited movement from its normal vertical axis and is fully insulated from the car truck against the noise and shock. The lower annulus 220 absorbs the rebound.

Modified swing bolster assemblies

In Figs. 14–18 inclusive, two modifications of the swing bolster assembly are shown. In Figs. 14–16, the swing bolster 330 connects directly with the swing hangers 331 without the interposition of a cantilever spring. The rubber annuli 332, 333 are depended upon in this arrangement for giving the necessary resiliency between the car truck and the car body.

The center bearing assembly is substantially the same as the one previously described, the principal difference being that the self-alining feature is eliminated.

In Figs. 17 and 18, the swing bolster 335 is equipped at each end with a single quarter-elliptical cantilever spring 336 which in turn is supported by the swing hangers 331. The center bearing assembly is substantially the same as shown in Figs. 14–16 inclusive.

Side bearings

The bolsters 61 and 62 are each equipped at their ends with side bearings generally designated 230 which consist essentially of a side bearing bracket 231 securely welded to the body framework, and which carries on its underface a rubber backed plate 232 of self-lubricating material which is adapted to slide upon a chrome-finished wear plate 233 carried at the end of the bolster.

The side bearings, it will be understood, limit side sway of the car body with respect to the car trucks.

We claim:

1. A car truck comprising a truck frame, a pair of wheeled axles, journals for supporting the frame on the axles, driving engines mounted outboard on opposite sides of the frame for driving diagonally opposite ends of the axles, and radius rods between the journals and the truck frame.

2. A car truck comprising a truck frame, a pair of wheeled axles, journals for suspending the truck frame from the axles with the points of support beneath the said journals, driving engines mounted outboard on opposite sides of the frame for driving diagonally opposite ends of the axles, and radius rods extending from the journals to the truck frame.

3. A car truck comprising a truck frame, a pair of wheeled axles the distance between which is greater than the length of the truck frame, leaf springs projecting from the four corners of the frame outwardly toward the adjacent axles, journals for supporting the leaf springs on the axles, a truck bolster, and means for resiliently supporting the bolster on the truck frame.

4. A car truck comprising a truck frame, a pair of wheeled axles the distance between which is greater than the length of the truck frame, leaf springs secured to and projecting from the four corners of the frame outwardly toward the adjacent axles, journals for supporting the leaf springs on the axles, a truck bolster, swing hangers at the sides of the truck frame, and means for supporting the bolster on the said hangers.

5. A car truck comprising a pair of wheeled axles, a truck frame of less length than the distance between said axles, leaf springs projecting from the four corners of the frame outwardly toward the adjacent axles, journals for supporting the leaf springs on the axles, a truck bolster, and leaf springs for supporting the bolster on the truck frame.

6. A car truck comprising a pair of wheeled axles, a truck frame of less length than the distance between said axles, leaf springs projecting from the four corners of the frame outwardly toward the adjacent axles, journals for supporting the leaf springs on the axles, a truck bolster, swing hangers at the sides of the truck frame, and means for supporting the bolster on the said hangers, said means including leaf springs interposed between the bolster and the hangers.

7. In a car truck, a truck frame, wheeled axles supporting the frame, a driving motor mounted on said frame outside the gauge line of the adjacent wheels, a driving connection between the motor and one of the axles, said connection including a worm gear on the axle, and a worm in mesh with the gear, a second driving motor mounted on the other side of the frame outside of the gauge line of the adjacent wheels, a driving connection between the motor and another of said axles, said last-named connection including a worm gear on the axle and a worm in mesh with the gear.

8. In a car truck, a truck frame, wheeled axles supporting the frame, a driving motor mounted on said frame outside the gauge line of the adjacent wheels, means for driving one of the axles from said motor, a second motor mounted on the opposite side of the frame, means for driving another axle from said last-named motor, said means including worm gears keyed to the ends of the axles and worms in mesh with the gears.

9. In a car truck, a truck frame, wheeled axles supporting the frame, a driving motor mounted on said frame outside the gauge line of the adjacent wheels, means for driving one of the axles from said motor, said means including a worm gear keyed to the end of the axle, a worm in mesh with the gear, a gear casing having journals for supporting the worm, bearings on opposite sides of the worm gear for supporting the gear casing on the axle, and a radius rod having its ends pivotally connected to said motor and said gear casing by relatively fixed pivots.

10. In a car truck, a truck frame, wheeled axles supporting the frame, a driving motor mounted on said frame outside the gauge line of the adjacent wheels, means for driving one of the axles from said motor, said means including a worm gear keyed to the end of the axle, a worm in mesh with the gear, a gear casing having journals for supporting the worm, bearings on opposite sides of the worm gear for supporting the gear casing on the axle, and an arm connecting the gear casing to the motor.

11. In a car truck, a truck frame, wheeled axles supporting the frame, a driving motor mounted on said frame outside the gauge line of the adjacent wheels, means for driving one of the axles from said motor, said means including a worm gear keyed to the end of the axle, a worm in mesh with the gear, a gear casing having journals for supporting the worm, bearings on opposite sides of the worm gear for supporting the gear casing on the axle, and an arm connecting the gear casing to a relatively fixed point on the car truck.

12. In a railway car truck, a truck frame, wheeled axles supporting the frame, an internal combustion engine for driving the truck, and means for mounting the engine on one side of the frame outside the gauge line of adjacent wheels, said means comprising a front motor support, a rear motor support, and an arm connecting the upper part of the engine to the truck frame.

13. In a railway car truck, a truck frame, wheeled axles supporting the frame, an internal combustion engine for driving the truck, and means for mounting the engine on one side of the frame outside the gauge line of adjacent wheels, said means comprising a front motor support, a rear motor support, an arm connecting the upper part of the engine to the truck frame, and cushioning means associated with said front and rear motor supports.

14. In a railway car truck, a truck frame, wheeled axles supporting the frame, an internal combustion engine for driving the truck, and means for mounting the engine outboard on one side of the truck frame, said means comprising a movable front motor support, a pivoted rear motor support, and an arm pivotally connecting the upper part of the engine to the truck frame.

15. A truck for railway cars comprising wheeled axles spaced apart, a truck frame of less length than the distance between said axles, springs for supporting said frame from said axles, and a truck bolster carried by the frame.

16. A truck for railway cars comprising wheeled axles spaced apart, a truck frame of less length than the distance between said axles, cantilever springs, means for attaching said springs to said axles at a point below said axles with the lower portion of said frame below the plane of said axles, and a truck bolster carried by the frame.

17. A truck for vehicles comprising two axles spaced apart, a frame of a length less than the distance between said axles, and means for resiliently supporting said frame from said axles, said frame formed of metallic tubes trussed vertically and horizontally.

18. In a truck for railway cars, a hollow axle, wheels rigidly mounted on said axle, axle bearings for said axle adjacent to said wheels inwardly thereof, a stub axle non-rotatably connected to the hollow axle and extending into the ends of said axle beyond said bearing, and a worm gear mounted on said stub axle outwardly of the wheel.

19. In a car truck a truck frame, rotating wheeled axles supporting the frame, a driving motor mounted on one side of the frame outside the gauge line of the adjacent wheels, means for driving one of the axles from one end thereof from said motor, and a brake at the opposite end of said last-named axle from said motor for resisting the rotation of said axle when said brake is operated.

20. A vehicle comprising a pair of wheeled axles, a triangulated truck frame comprising space framework, said framework comprising metal tubes welded together and trussed to resist body weight, driving and braking loads, and means for resiliently supporting said frame from said axles.

21. A car truck comprising a pair of wheeled axles, a truck frame, internal combustion engines mounted outboard on opposite sides of the truck frame, driving means connecting the engines to diagonally opposite ends of the axles, and braking means at one end of each of said axles.

22. A car truck comprising a pair of wheeled axles, a truck frame, driving motors mounted outboard on opposite sides of the truck frame, driving connections between the motors and diagonally opposite ends of the axles, and braking means at one end of each of said axles.

23. A car truck comprising a pair of wheeled axles, a truck frame, driving motors mounted outboard on opposite sides of the truck frame, driving connections between the motors and diagonally opposite ends of the respective axles, and braking means at the other diagonally opposite ends of said axles.

24. In a car truck, a truck frame fabricated of metal tubing having intersecting ends welded together and trussed to resist body weight, driving and braking loads, and driving motors mounted outboard on opposite sides of said trussed truck.

25. A car truck comprising a pair of wheeled axles supporting a truck frame, driving motors mounted outboard on opposite sides of said truck frame, driving connections between said motors and diagonally opposite ends of said axles carried exteriorly of the wheels.

26. A car truck comprising a pair of wheeled axles supporting a truck frame, driving motors mounted outboard on opposite sides of the truck frame, one driving exclusively the adjacent end of one of the axles, and the other driving exclusively the adjacent end of the other axle.

27. A truck for railway cars comprising wheeled axles spaced apart, a truck frame of less length than the distance between said axles mounted on the axles, a truck bolster resiliently supported on the frame, springs for supporting said frame from said axles, and internal combustion engines mounted outboard on opposite sides of the truck.

28. In a railway car truck, a framework consisting of metal tubing having intersecting ends welded together and trussed to resist body weight, driving and braking loads, wheeled axles supporting the framework, an internal combustion engine for driving said truck, and means for mounting the engine on said frame outside of the gauge line of adjacent wheels, said means including cantilever arms projecting transversely from the truck frame.

29. In a railway car truck, a framework consisting of metal tubing having intersecting ends welded together and trussed to resist body weight, driving and braking loads, wheeled axles supporting the framework, an internal combustion engine for driving said truck, and means for mounting the engine on said frame outside of the gauge line of adjacent wheels, said means including cantilever arms projecting transversely from the truck frame, and trusswork for preventing the ends of the cantilever arms from moving laterally.

30. A car truck comprising a truck frame, wheeled axles supporting the truck, internal combustion engines mounted outboard on opposite sides of the truck, each driving exclusively an adjacent end of one of the car axles leaving the central portion of the car truck clear of driving mechanism, and an automatic gear shift mechanism associated with each engine, thereby leaving the central portion of the car truck clear of control mechanism for shifting gears.

WILLIAM B. STOUT.
EVAN H. WRIGHT.

DISCLAIMER 2,056,219.—*William B. Stout* and *Evan H. Wright*, Detroit, Mich. CAR TRUCK. Patent dated October 6, 1936. Disclaimer filed January 16, 1940, by the assignee, *Pullman-Standard Car Manufacturing Co.*

Hereby enters this disclaimer of claim 20 in said specification.

[*Official Gazette February 13, 1940.*]